(12) United States Patent
Otts

(10) Patent No.: US 9,221,137 B2
(45) Date of Patent: Dec. 29, 2015

(54) SYSTEM AND METHOD FOR LASER-BASED AUTO-ALIGNMENT

(71) Applicant: Beckman Coulter, Inc., Brea, CA (US)

(72) Inventor: Stephen Otts, Brownsburg, IN (US)

(73) Assignee: Beckman Coulter, Inc., Brea, CA (US)

( * ) Notice: Subject to any disclaimer, the term of this patent is extended or adjusted under 35 U.S.C. 154(b) by 40 days.

(21) Appl. No.: 14/046,868

(22) Filed: Oct. 4, 2013

(65) Prior Publication Data

US 2014/0173870 A1   Jun. 26, 2014

Related U.S. Application Data

(60) Provisional application No. 61/745,252, filed on Dec. 21, 2012, provisional application No. 61/772,971, filed on Mar. 5, 2013.

(51) Int. Cl.
*G06F 19/00* (2011.01)
*B23P 19/04* (2006.01)
*B25J 9/16* (2006.01)

(52) U.S. Cl.
CPC .............. *B23P 19/04* (2013.01); *B25J 9/1692* (2013.01); *G05B 2219/40293* (2013.01); *G05B 2219/40613* (2013.01); *Y10T 29/4978* (2015.01); *Y10T 29/53087* (2015.01)

(58) Field of Classification Search
CPC ..................................................... B23P 19/04
USPC ........................................................ 29/407.1
See application file for complete search history.

(56) References Cited

U.S. PATENT DOCUMENTS

| 4,380,696 | A |   | 4/1983  | Masaki |
|-----------|---|---|---------|--------|
| 5,297,238 | A |   | 3/1994  | Wang et al. |
| 5,768,137 | A | * | 6/1998  | Polidoro et al. ............ 700/186 |
| 5,978,080 | A |   | 11/1999 | Michael et al. |
| 5,978,521 | A |   | 11/1999 | Wallack et al. |
| 6,163,946 | A | * | 12/2000 | Pryor ........................ 29/407.04 |
| 6,763,284 | B2|   | 7/2004  | Watanabe et al. |
| 7,213,684 | B2|   | 5/2007  | Bruns et al. |

(Continued)

FOREIGN PATENT DOCUMENTS

| EP | 1 043 126 A2 | 10/2000 |
| EP | 1 043 126 A3 | 10/2000 |

(Continued)

OTHER PUBLICATIONS

Invitation to Pay Additional Fees mailed on Jan. 29, 2014 for PCT Patent Application No. PCT/US2013/063562, 5 pages.

(Continued)

*Primary Examiner* — Bhavesh V Amin
(74) *Attorney, Agent, or Firm* — Kilpatrick Townsend & Stockton LLP

(57) ABSTRACT

In a laser-based alignment system, a laser sensor tool, comprising a laser emitter and detector element can be gripped by a gripper unit of a robotic arm and used to automatically align the robotic arm with a work surface. A landmark on the work surface can be identified by scanning the work surface with the laser sensor in an X-Y plane. A center point of the landmark in the X-Y plane can be determined to align the gripper unit with the work surface in the X-Y plane. The robotic arm can be calibrated on a Z-axis by moving the gripper downward in a z-direction until the gripper unit contacts the work surface.

20 Claims, 11 Drawing Sheets

(56) References Cited

U.S. PATENT DOCUMENTS

| | | |
|---|---|---|
| 7,222,431 B1 | 5/2007 | Norton et al. |
| 7,715,946 B2 | 5/2010 | Watanabe et al. |
| 7,818,097 B2 | 10/2010 | Fein et al. |
| 8,295,585 B2 | 10/2012 | Wienand et al. |
| 2002/0184777 A1 | 12/2002 | Tsai et al. |
| 2003/0142289 A1 | 7/2003 | Ortyn et al. |
| 2003/0144765 A1* | 7/2003 | Habibi et al. .................. 700/259 |
| 2005/0102064 A1 | 5/2005 | Donoso et al. |
| 2005/0283274 A1* | 12/2005 | Kleinschmitt ................ 700/245 |
| 2006/0036170 A1 | 2/2006 | Lachaine et al. |
| 2006/0047363 A1* | 3/2006 | Farrelly et al. ................ 700/245 |
| 2007/0196016 A1 | 8/2007 | Chen et al. |
| 2009/0032693 A1 | 2/2009 | Kakuta et al. |
| 2009/0182454 A1 | 7/2009 | Donoso et al. |
| 2009/0251699 A1 | 10/2009 | George |
| 2009/0257036 A1 | 10/2009 | Chuang |
| 2011/0301902 A1 | 12/2011 | Panagas |
| 2013/0051206 A1 | 2/2013 | Ghazvini et al. |

FOREIGN PATENT DOCUMENTS

| | | |
|---|---|---|
| JP | 64-2889 A | 1/1989 |
| WO | 2011/163184 A1 | 12/2011 |
| WO | 2012/129110 A1 | 9/2012 |
| WO | 2013/023130 A1 | 2/2013 |

OTHER PUBLICATIONS

Invitation to Pay Additional Fees mailed on Feb. 18, 2014 for PCT Patent Application No. PCT/US2013/063523, 5 pages.

Zhuang, Hangi et al. "Using a Scale: Self-Calibration of a Robot System with Factor Method," *Proceedings of the 2001 IEEE International Conference on Robotics & Automation*; Seoul, Korea; May 21-26, 2001; pp. 2797-2803.

International Search Report and Written Opinion mailed on May 23, 2014 for PCT Patent Application No. PCT/US2013/063523, 20 pages.

International Search Report and Written Opinion mailed on May 23, 2014 for PCT Patent Application No. PCT/US2013/063562, 19 pages.

* cited by examiner

SYSTEM AND METHOD FOR LASER-BASED AUTO-ALIGNMENT

CROSS-REFERENCE TO RELATED APPLICATIONS

This application claims priority to U.S. Provisional Patent Application No. 61/745,252, filed on Dec. 21, 2012, titled "SYSTEM AND METHOD FOR AUTO-ALIGNMENT," by Stefan Rueckl, et al. and to U.S. Provisional Patent Application No. 61/772,971, filed on Mar. 5, 2013, titled "SYSTEM AND METHOD FOR AUTO-ALIGNMENT," by Stefan Rueckl, et al., each of which is herein incorporated by reference in its entirety for all purposes. This application is related to U.S. Provisional Patent Application No. 61/710,612, filed on Oct. 5, 2012, titled "SYSTEM AND METHOD FOR AUTO-ALIGNMENT," by Stefan Rueckl and U.S. patent application Ser. No. 14/046,829, filed on Oct. 4, 2013, titled "SYSTEM AND METHOD FOR CAMERA-BASED AUTO-ALIGNMENT," by Stefan Rueckl et al., each of which is herein incorporated by reference in its entirety for all purposes.

BACKGROUND

When a Laboratory Automation System (LAS) is installed at a customer site, a service technician aligns elements of the system, e.g. the frame, XY-gantry for the robotic arm, and the drawers on the work surface, to enable the robotic arm to precisely grip and transfer sample tubes from one position to another position. Typically, alignment of the robot arm to the working space was done manually. Manual alignment is a slow and costly process, particularly on a complex LAS which may include several robotic arms which must each be separately aligned. Additionally, manual alignment has the potential to introduce human error into each alignment. Auto-alignment processes allow for fewer service technicians to install and align more LAS in less time and with fewer risks of incorrect alignment due to human error.

In a typical LAS, each robotic arm is fixed to a gantry over a work surface, which can include, e.g., test tubes in racks that can be moved to different positions or tools on the work surface. For example, moving a test tube from a distribution rack to a centrifuge adapter. Gripping movement needs to be precise to avoid various problems. For example, if the robotic arm cannot grip a tube, or if it successfully grips a selected tube, but destroys the tube due to a misalignment. Conventional manual alignment can include various steps, such as manually positioning the gripper arm to several different positions on the work surface, either by hand or using an external drive motor. Additionally, the robotic arms need to be separately aligned for racks or drawers on the work surface. This procedure can take many hours to a day per robotic arm for manual alignment by a service technician.

Embodiments of the present invention address these and other problems.

SUMMARY

Disclosed herein are an auto-alignment process and associated technical arrangements to calibrate and/or align a robotic arm including a gripper unit within a Laboratory Automation System (LAS), in accordance with an embodiment.

In a laser-based alignment system, a laser sensor tool, comprising a laser emitter and detector element can be gripped by a gripper unit of a robotic arm and used to automatically align the robotic arm with a work surface. A landmark on the work surface can be identified by scanning the work surface with the laser sensor. A center point of the landmark on the surface can be determined to align the gripper unit with the work surface. The robotic arm can be calibrated on a Z-axis by moving the gripper downward in a z-direction until the gripper unit contacts the work surface.

One advantage of the laser-based alignment system is that it allows the alignment to be performed in a manner which utilizes the gripper's normal functions, e.g., gripping a tool with the gripper fingers. During laser-based alignment, the gripper can grip a digital laser sensor to detect a landmark on the work surface, such as a hole or post.

DETAILED DESCRIPTION

Figure 1A:
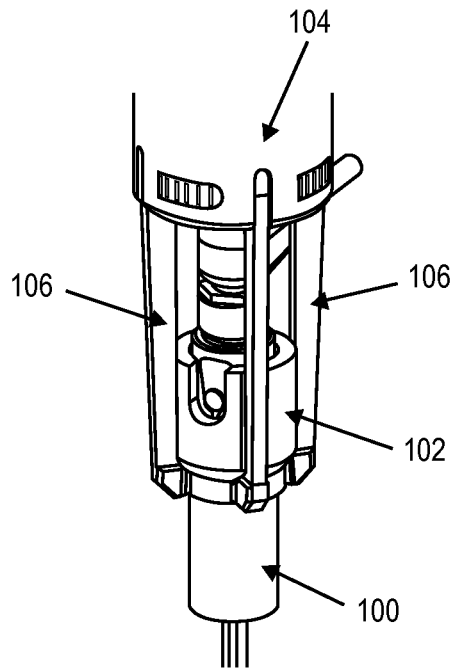
FIGS. 1A-1C show examples of a gripper unit and grippable laser sensor tools, in accordance with an embodiment of the invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Disclosed herein are systems and methods for auto-alignment of a robotic arm to a work surface using a laser-based optical measurement tool. In accordance with an embodiment, a robotic arm, including a gripper unit, can grip a laser sensor. The laser sensor can be configured to emit a laser and receive a reflection. In some embodiments, the robotic arm can be connected to an X-Y gantry, allowing the robotic arm to be moved in an X-Y plane over a work surface. Embodiments of the present invention can also be used with other types of robots. To align the robotic arm with the work surface, the gripper unit can pick up a laser sensor, and the robotic arm can move in the X-Y plane to scan the work surface with the laser sensor. As used herein, the X-Y plane can refer to a plane that is parallel to the work surface. The work surface can include one or more landmarks at known positions on the work surface. A landmark can be any object or location that is identifiable to the laser sensor. For example, in some embodiments, a bore hole can be used as a landmark. A bore hole is identifiable to the laser sensor as a location from which a reflection is not read. In some embodiments, a landmark can be a position on the work surface to which a non-reflective coating has been applied. The non-reflective coating can be selected based on the frequency of the laser sensor, so as to be non-reflective in the spectrum emitted by the laser sensor.

In accordance with an embodiment, the position of a landmark can be identified by scanning the landmark in a first direction to determine a first edge of the landmark and a second edge of the landmark based on reflections received by the laser sensor. A first center point of the landmark on a first axis can then be determined based on the first edge and the second edge. The landmark can then be scanned in a second direction, orthogonal to the first direction, from the first center point of the landmark to determine a third edge and a fourth edge. A second center point of the landmark on a second axis can then be determined based on the third edge and fourth edge. Scanning of the landmark can continue in this manner until a plurality of center points are identified within a preset distance of each other. In some embodiments, an average of the center points can be calculated and stored as the landmark center point. In some embodiments, the robotic arm can be aligned with a plurality of landmarks on the work surface by repeating the above-described process.

As described above, a position of one or more landmarks on the work surface can be identified using a laser sensor to align the robotic arm with the work surface in the X-Y plane. The robotic arm can be calibrated on a Z-axis by moving the robotic arm from a gripping position above the work surface, downward in a Z-direction until the gripper unit contacts the work surface. As used herein, the Z-axis can refer to an axis that is orthogonal to the work surface. A "hard" touch off can be used at each landmark location to determine the z height of the landmark. In some embodiments, the robotic arm can be raised, in the Z-direction to a maximum height above the work surface, before the robotic arm is lowered until it makes contact with the work surface at the landmark. In some embodiments, a Z-axis tool can be gripped by the gripper unit while aligning the robotic arm in the Z-direction. In some embodiments, the laser sensor can be used to measure the height of the robotic arm over the work surface based on the reflection received from the laser sensor. The measured distance can be used to calibrate the robotic arm on the Z-axis.

Figure 1B:
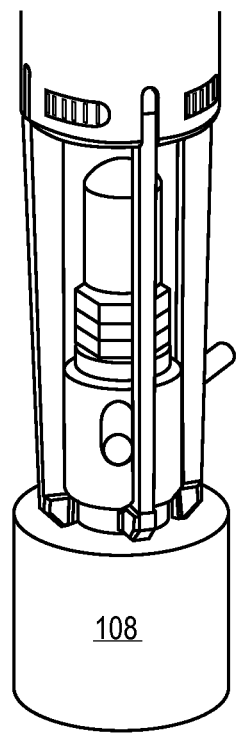
Figure 1C:
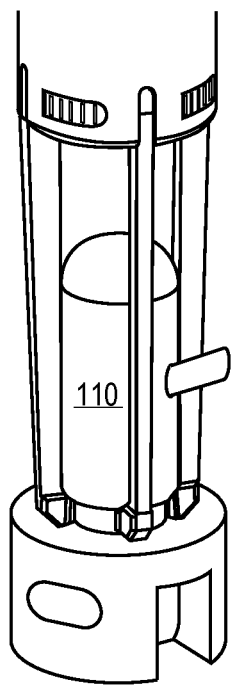

FIGS. 1A-1C show examples of a gripper unit and grippable laser sensor tools, in accordance with an embodiment of the invention. As shown in FIG. 1A, laser sensor 100 can be mounted in a housing 102 capable of being gripped by a gripper unit 104 of a robotic arm. In accordance with an embodiment, the laser sensor can be a background suppression laser sensor, a spot reflective laser sensor, or any other type of laser sensor that can be mounted in a grippable housing. The laser sensor housing 102 can be configured for gripping, such as with a ledge, groove, or similar feature that can be reliably gripped by gripper fingers 106. In some embodiments, the laser sensor is recessed at the bottom side of the laser sensor housing, to prevent damage or the accumulation of dirt/dust on the sensor. FIGS. 1B and 1C show alternative laser sensor housings 108 and 110 that each include a ledge. As shown in FIGS. 1B and 1C, the gripper finger tips can bottom out on the ledges, providing a reliable and repeatable gripping position for the laser sensor.

In accordance with an embodiment, using a grippable laser sensor to align the robotic arm results in an alignment that represents that actual usage of the robotic arm. The robotic arm can be aligned without modifying the gripper unit, for example any pads mounted to the gripper fingers do not need to be removed during alignment. Laser sensor tools can be wired or wireless. If wired, the cord can come out between the gripper fingers at various positions, depending on the configuration of the laser sensor. As described above, each laser sensor can also be a detector, configured to detect a reflection of the laser emitted by the laser sensor.

In some embodiments, an imaging device, such as a camera, can be used to detect whether a reflection of the laser emitted by the laser sensor. When the laser is incident on the work surface, the reflection is visible to the imaging device. When the laser is incident on a landmark, the reflection is modified or not observable to the imaging device. For example, a non-reflective landmark may attenuate the reflection of the laser such that it is not observable to, or can be distinguished by, the imaging device. Similarly, a bore hole landmark will not reflect the laser, and any reflection from a surface below the work surface is not observable to, or can be distinguished by, the imaging device. In some embodiments, the imaging device can be mounted to the gripper unit.

Figure 2:
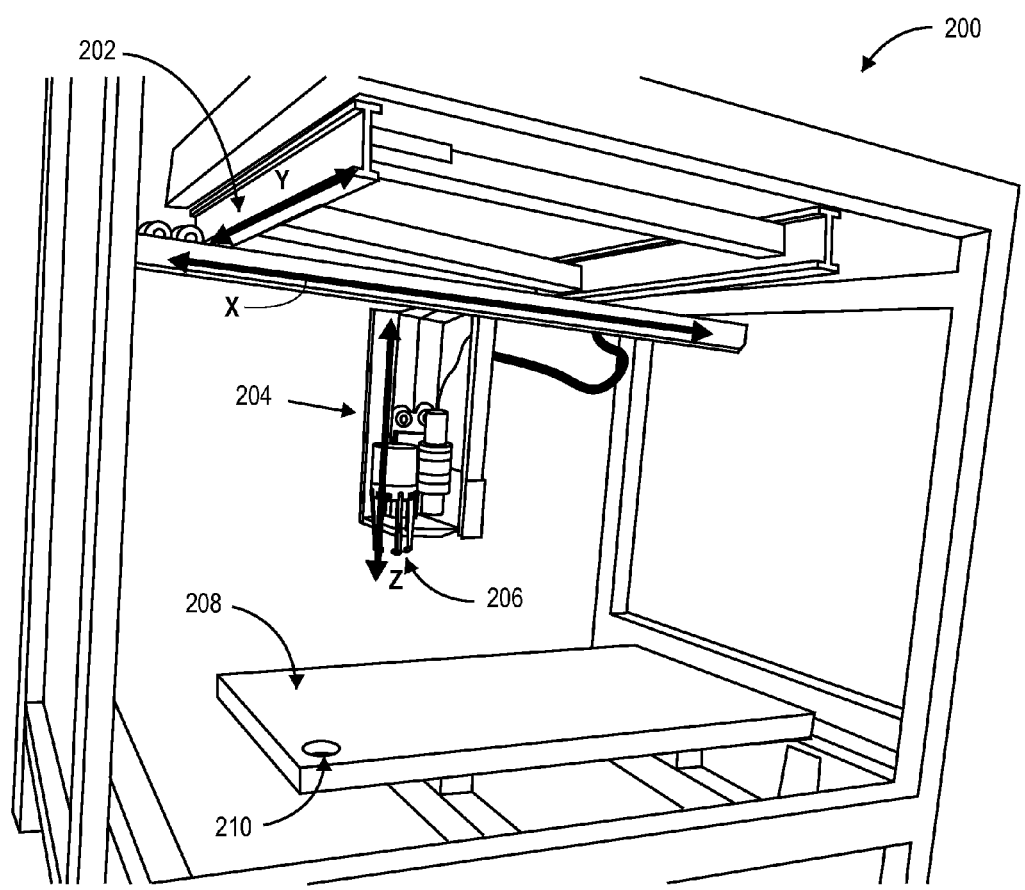
FIG. 2 shows an example of a laboratory automation system (LAS), in accordance with an embodiment of the invention.

FIG. 2 shows an example of a laboratory automation system (LAS), in accordance with an embodiment of the invention. As shown in FIG. 2, LAS 200 can include a frame with an X-Y gantry 202 to which a Z-axis 204 has been attached. A robotic arm including a gripper unit 206 can be coupled to the Z-axis 204. As described above, the X-Y gantry is operable to move the robotic arm and gripper unit above a work surface 208 in the X-Y plane, and the Z-axis is operable to move the robotic arm and gripper unit along up and down relative to the work surface 208. In accordance with an embodiment, each axis can be moved along tracks using one or more electric motors. In some embodiments, the motors can be brushed DC motors or stepper motors with a known motor resolution in steps per millimeter. One or more controllers, such as a microcontroller, processor, or other controller, can be used to control the motors associated with each axis and position the robotic arm in three dimensional space over the work surface. To align the robotic arm with the work surface, the work surface can include one or more landmarks 210 at known positions. Using a laser sensor, such as those described above with respect to FIGS. 1A-1C, the robotic arm can be automatically aligned with the one or more landmarks 210 on the work surface, enabling the robotic arm to perform functions where precision is important, such as picking up and repositioning objects on the work surface.

Figure 3:
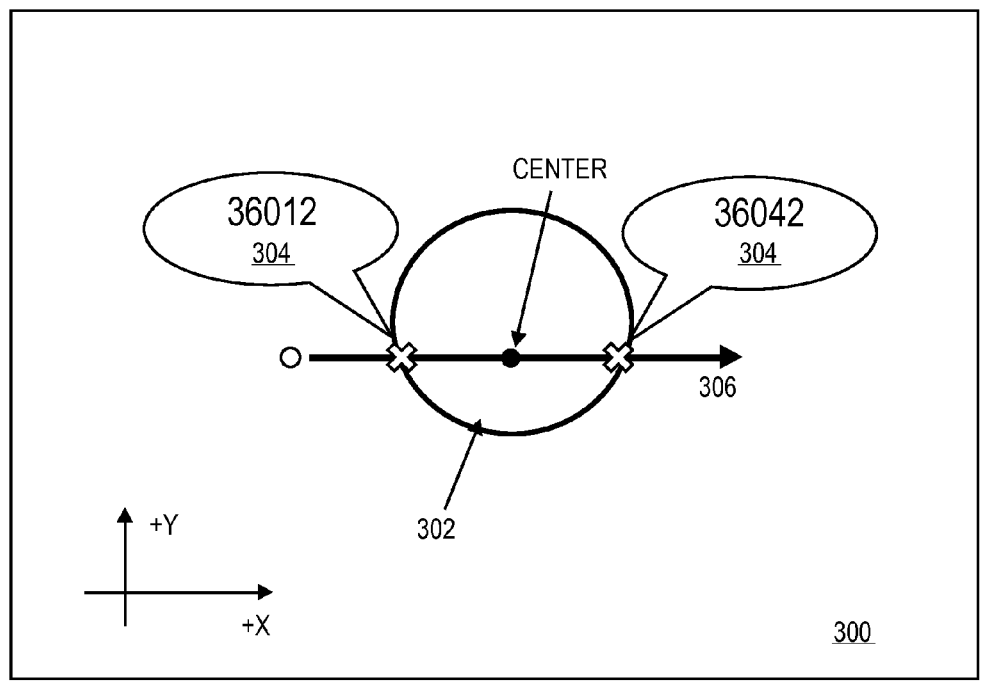
FIG. 3 shows an example of landmark detection, in accordance with an embodiment of the invention.

FIG. 3 shows an example of landmark detection, in accordance with an embodiment of the invention. As described above, landmarks used for laser-based auto-alignment can include bore holes machined into the work surface, or alternative non-reflective landmarks. The landmarks can be located at known positions. Bore holes provide reliable known locations on the surface which cannot be moved and which will not reflect the laser. Alternative non-reflective landmarks can be similarly utilized, such as a non-reflective dot which absorbs, or otherwise reduces the reflection, of light emitted by the laser sensor such that any reflection off the dot is not detectable by the laser sensor and/or imaging device. Positions of other tools and devices mounted to the work surface, such as racks, centrifuges, drawers, etc. can be known relative to the one or more landmarks. Thus, once the positions of the landmarks are known, the gripper is aligned to the other elements on the work surface.

In some embodiments, when the laser sensor tool is gripped by the gripper unit, an auto-alignment method can be executed during which the gripper unit, while gripping the laser sensor tool, is moved in the X-Y plane and the laser sensor tool is used to scan the work surface. For example, a central controller can send instructions to one or more axis controllers that move the robotic arm in a programmed path over the work surface. The central controller can additionally send instructions to a laser sensor controller to emit laser pulses and record reflections at timed intervals as the robotic arm moves in the programmed path. Flat areas on the work surface will reflect the laser pulses, whereas when the robotic arm and laser sensor tool are positioned over a landmark, no detectable reflection will be received.

As shown in FIG. 3, as the robot passes the laser across the hole, the reflection of the laser from the work surface 300 can be detected on the edges of the landmark 302. A controller, such as a laser sensor controller, central controller, or other suitable controller and/or processor, can record positions 304 of each transition, corresponding to the edges of the landmark 302. For example, the points at which no reflection or a modified reflection is received by the laser sensor tool can indicate the boundaries of the landmark. A modified reflection can include an attenuated reflection that is not as intense as the reflection off the work surface, as a result of a reflection from a less-reflective landmark or from an object beneath the work surface under the landmark. The position can correspond to a step or encoder count of the motor. In accordance with an embodiment, the center of the line across the hole can be calculated by averaging the two readings. To account for any hysteresis of the robotic arm drive system, such as a belt, the process can be repeated in the opposite direction. This process can determine a coordinate of the center point of the landmark on a first axis. The coordinate can correspond to an encoder count or step on the first axis. As shown in FIG. 3, the line 306 across the landmark is not centered on the landmark. The midpoint of this first line can be used as a starting point for determining the center of the landmark.

For example, in the embodiment shown in FIG. 3, a circular landmark is used. The robotic arm can be moved in alternating orthogonal directions (e.g., moved along a first path parallel to the X axis, followed by a second path parallel to the Y axis, followed by a third path parallel to the X axis, and so on) across the landmark to iteratively determine the center point of the landmark. Each transit of the robotic arm across the landmark can identify boundary points of the landmark corresponding to end points of a line across the landmark. The first transit of the robotic arm across that landmark can be in a direction parallel to the X or Y axis. Using the end points of the first transit line, the midpoint of the line can be determined and stored. The robotic arm can then be positioned over the midpoint of the first transit line and a second transit of the robotic arm across the landmark can be performed in a direction substantially orthogonal to the first transit. For example, if line 306, which is parallel to the X-axis, is taken to represent the first transit line, then the second transit line would be a line parallel to the Y-axis that intersects line 306 at the center point. By positioning the robotic arm over the midpoint of the first transit line to perform the second transit, the end points of the second transit line will be collinear with the midpoint of the first transit line. The end points of the second transit line can be identified and a midpoint of the second transit line determined and stored. The location of the midpoint on the first transit line can be compared to the location of the midpoint on the second transit line. If the two locations are within a predetermined distance, an average of the two locations can be calculated and stored. The average location corresponds to the center point of the landmark. If the two locations are not within the predetermined distance, the auto-alignment process can continue iteratively from the midpoint on the second transit line by repeating the process described above from the midpoint on the second transit line in alternating orthogonal directions.

In some embodiments, the measurements of the landmark along each axis can be repeated with the laser sensor tool gripped by the gripper in different rotational positions, to reduce stochastic measuring errors and production tolerances. This is discussed further below with respect to FIG. 4.

Figure 4:
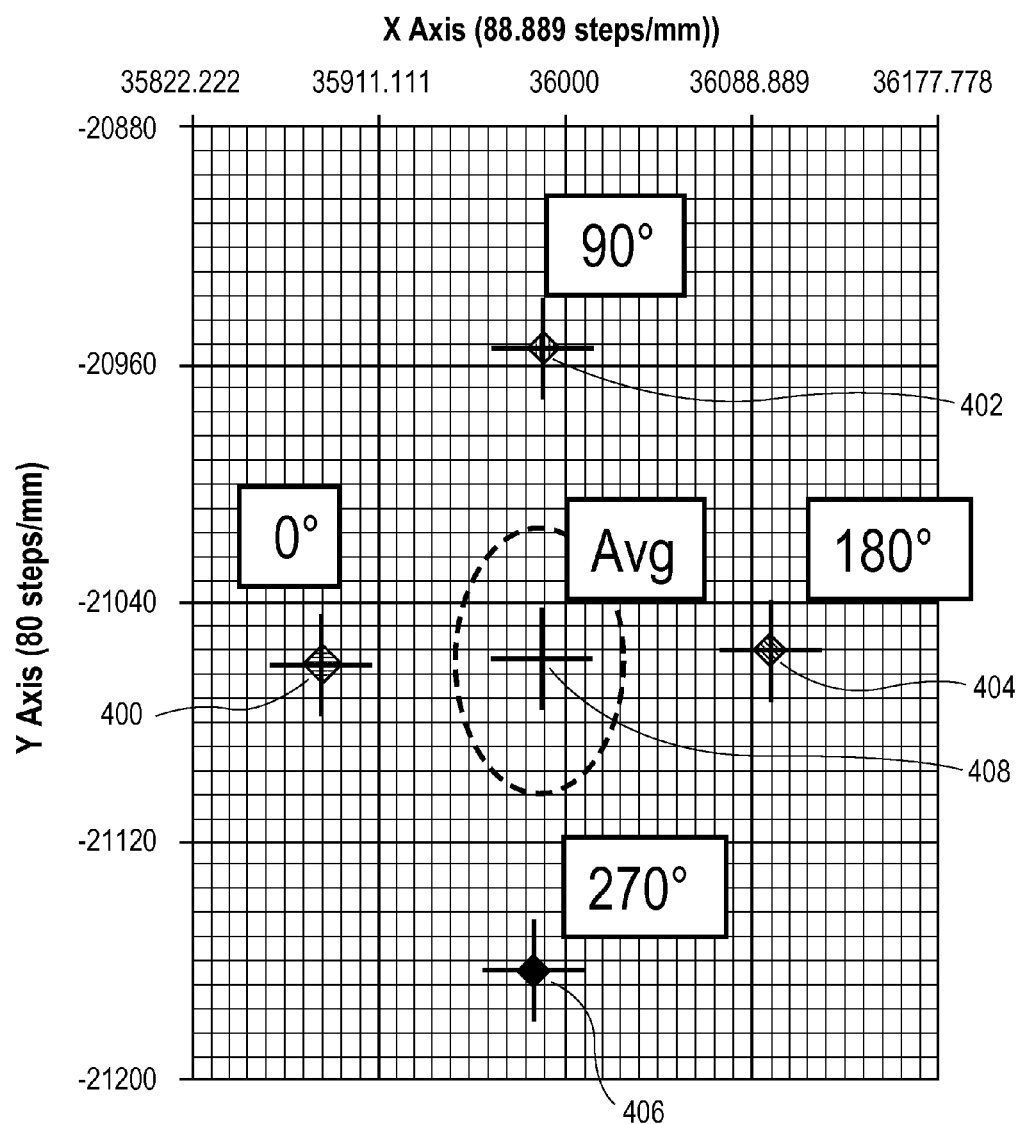
FIG. 4 shows an example of landmark detection using an average of multiple measurements, in accordance with an embodiment of the invention.

FIG. 4 shows an example of landmark detection using an average of multiple measurements, in accordance with an embodiment. Due to variations in the fingers of the gripper, such a differences in wear of each finger pad or wear of the gripping mechanism, the laser sensor tool may not be completely aligned with the gripper axis while gripped. This can result in an offset in the measured center location, depending on how the laser tool was positioned when it was picked up. In accordance with an embodiment, to account for these variations, once a center 400 of a landmark has been determined, the laser sensor can be rotated 90 degrees and the process repeated. For example, the gripper unit can place the laser sensor on the work surface, rotate 90 degrees, and pick up the laser sensor. Alternatively, the gripper unit can pick up the laser sensor from the work surface, rotate gripper unit less than 90 degrees, place the laser sensor back on the work surface, and repeat until the laser sensor has been rotated 90 degrees. A 90 degree center point 402 can then be determined. This can be repeated again by rotating the laser sensor 180 degrees relative to the initial position and determining a 180 degree center point 404, and again at 270 degrees relative to the initial position and determining a 270 degree center point 406. The resulting four measured center points 400, 402, 404, and 406 of the landmark can then be averaged and that average position 408 can be stored as the center of the landmark.

Figure 5:
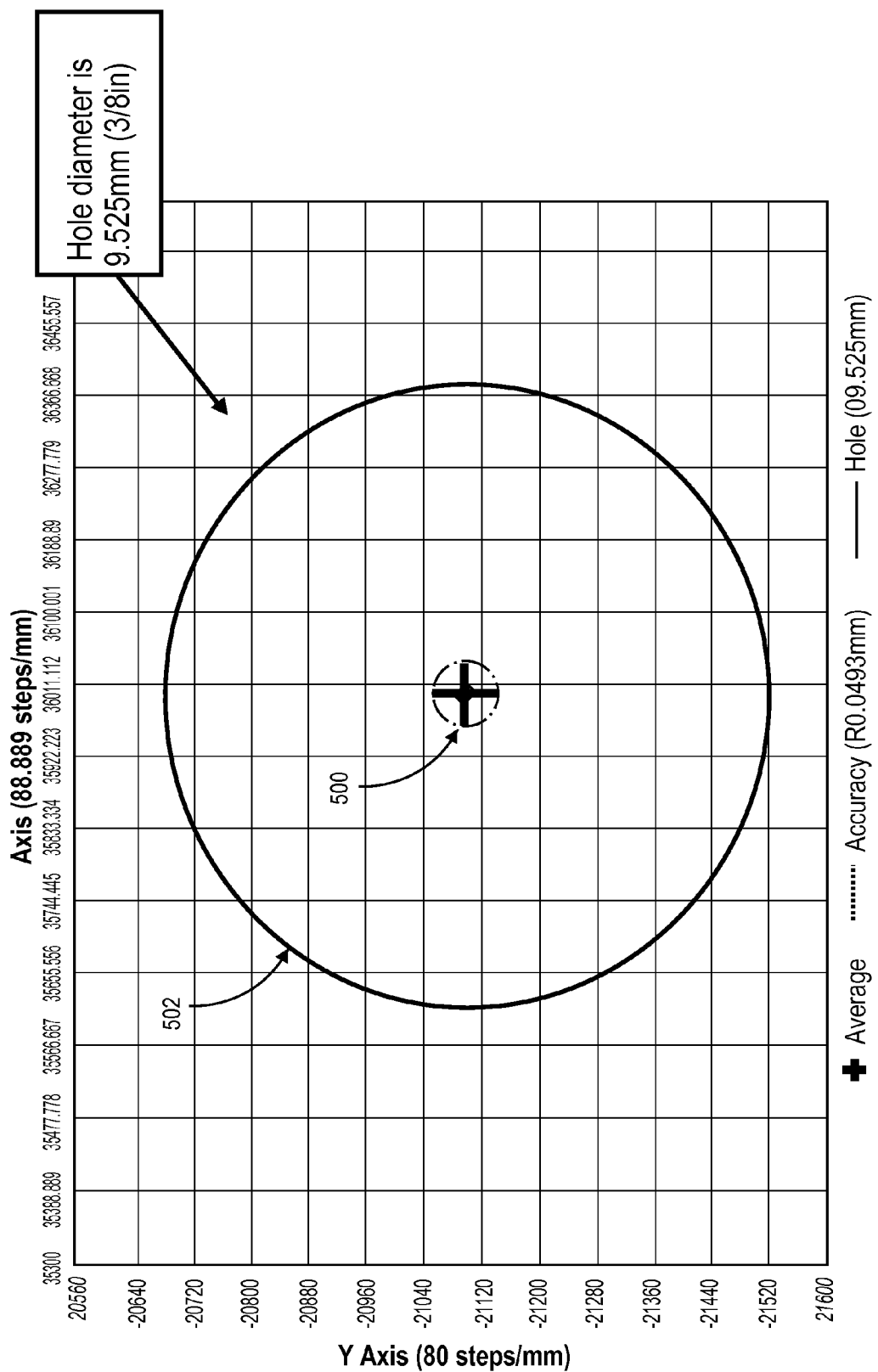
FIG. 5 shows a method of calibrating an XYZ-robot, in accordance with an embodiment of the invention.
Figure 6:
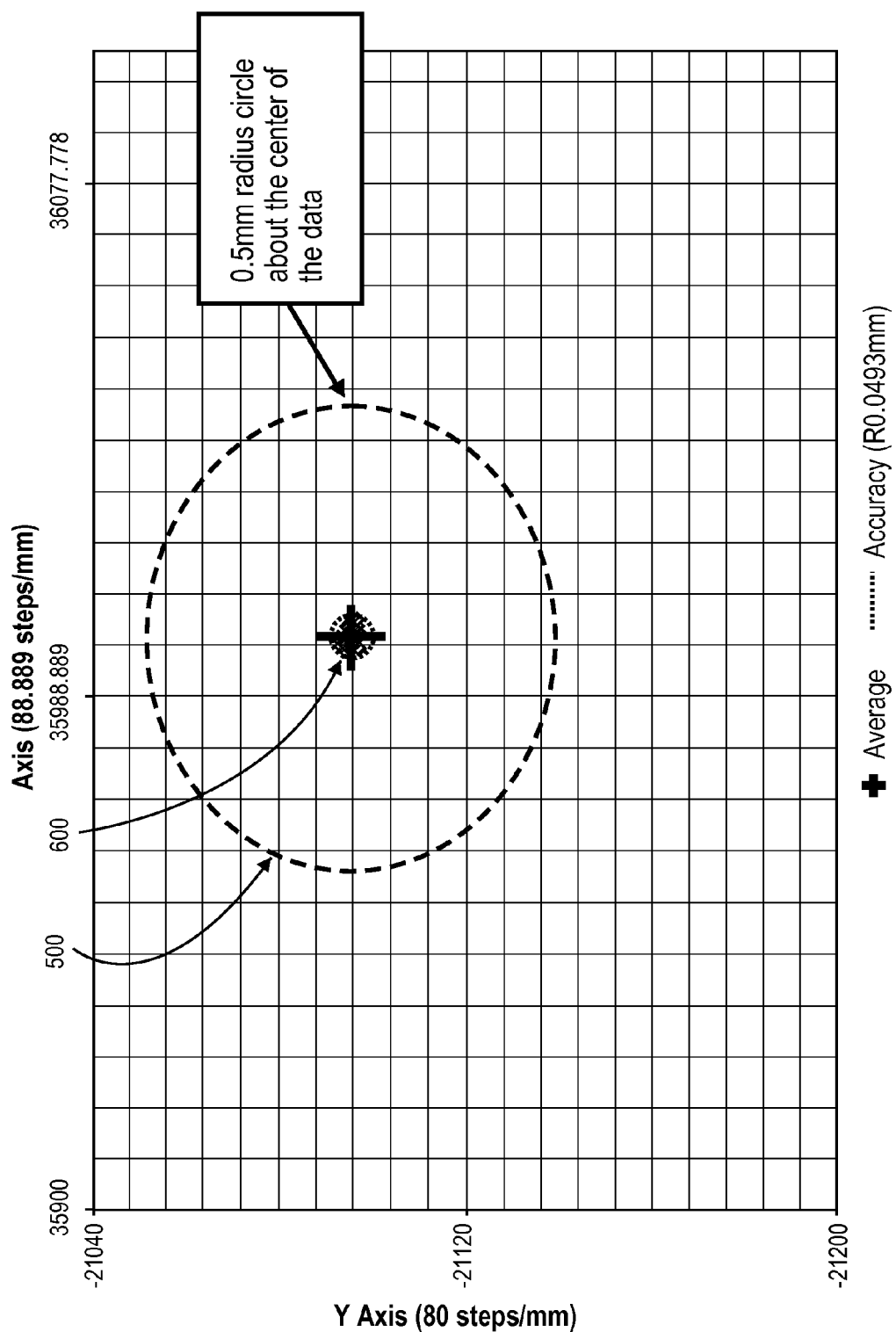
FIGS. 6-8 show X-Y calibration results using a laser sensor, in accordance with an embodiment of the invention.
Figure 7:
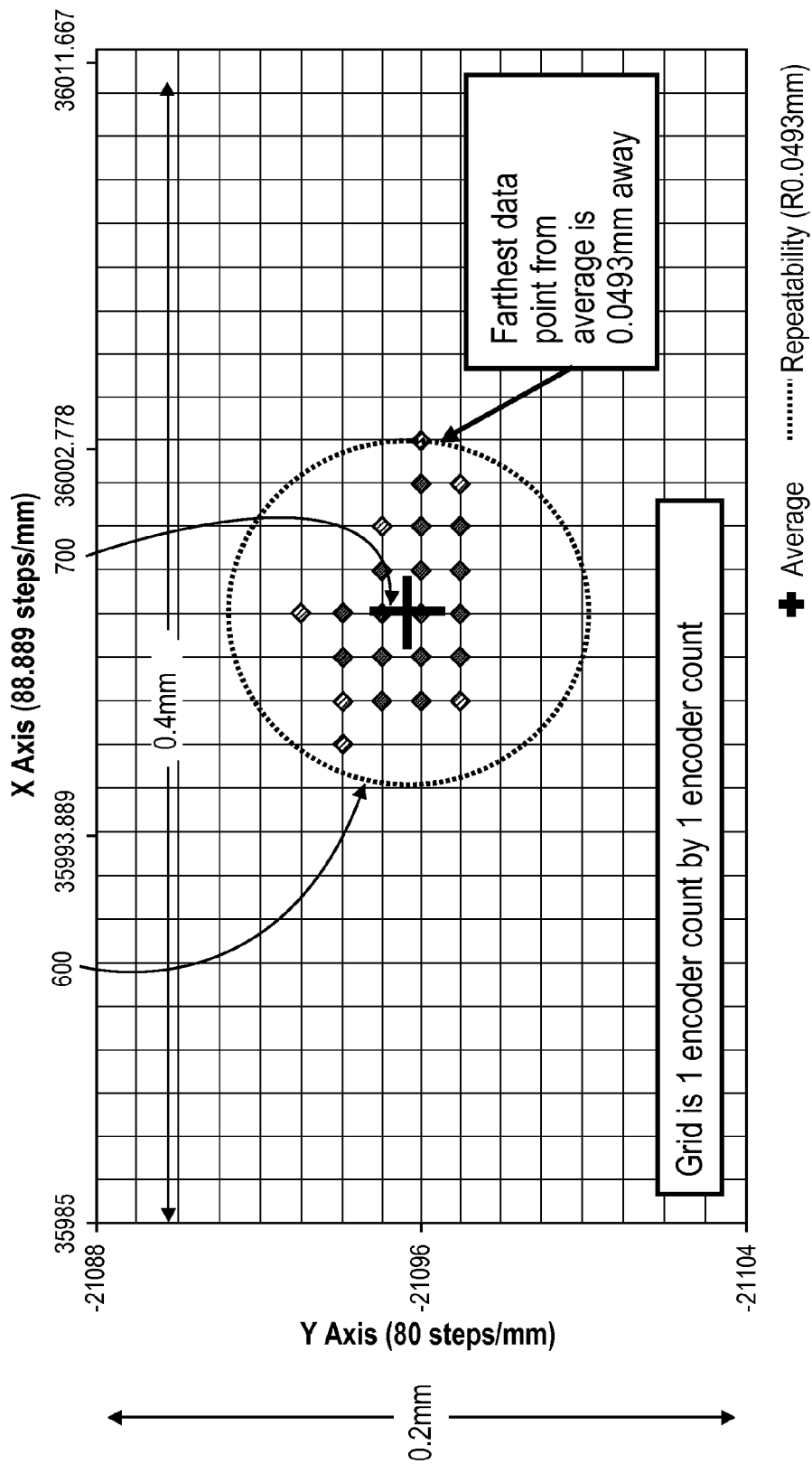

FIGS. 5-7 show X-Y calibration results using a laser sensor, in accordance with an embodiment of the invention. As shown in FIG. 5, the laser-based alignment methods described above can be used to identify the center of a ⅜ inch (9.525 mm) diameter bore hole landmark 502, to within a preset radius. In FIG. 5, the preset radius was set to 0.05 mm, however alternative preset radii can be used based on the required alignment precision required by a particular LAS installation. The average of the measurements is represented by a cross. The area inside the dashed circle 500 is shown in greater detail in FIG. 6.

FIG. 6 shows a more detailed view of the area inside dashed circle 500. Dashed circle 500 has a radius of 0.5 mm centered on the average center point of the landmark. Dotted circle 600 corresponds to the measured center point farthest from the average of the measured center points of the landmark. In the embodiment of FIGS. 5-7, the dotted circle 600 has a radius of 0.0493 mm. As this is less than the preset radius of 0.05 mm, the robotic arm is aligned.

FIG. 7 shows a plurality of measured center points according to the alignment methods described above. The grid in FIG. 7 is one encoder count by one encoder count. That is, each grid represents one step of the motor driving the robotic arm in the X and Y directions. The average of the data points is again represented by a cross 700.

Figure 8:
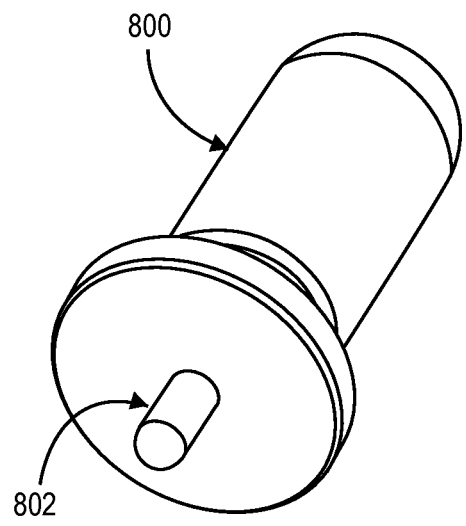
Figure 8:
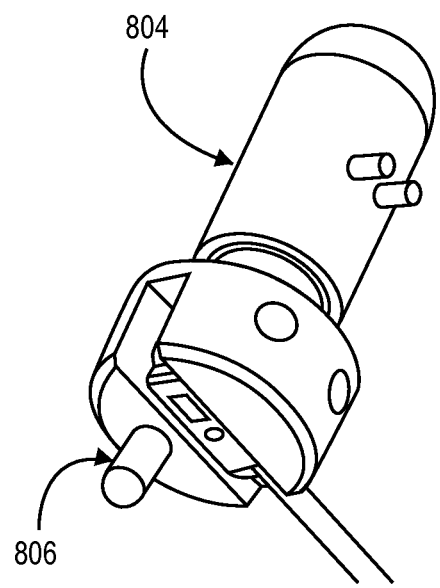

FIG. 8 shows examples of Z-calibration tools, in accordance with an embodiment of the invention. As shown in FIG. 8, a Z-calibration tool 800 can be designed to match the dimensions of the laser sensor tool. This enables the robotic arm to be calibrated in the Z-direction without risking damage to the laser sensor tool. The Z-calibration tool can include a rounded tip 802 extending from the bottom of the tool. During Z-calibration, the robotic arm can be lowered until resistance is met (e.g., until the rounded tip of the Z-calibration tool makes contact with the work surface). The rounded tip provides a stop which can impact the work surface without risking damage to the work surface or the gripper unit. Alternatively, a laser sensor tool 804 can be modified to include a rounded tip 806. Since the laser sensor tool 804 extends past the end of the gripper fingers, the rounded tip reduces the risk of damaging the laser sensor. Additionally, laser sensor 804 enables the gripper to be calibrated in all three dimensions without needing multiple tools. A pressure sensor can be incorporated into the robotic arm which is configured to stop the arm when a preset level of resistance is met.

In accordance with an embodiment, the laser sensor tool can include an analog laser sensor. Using an analog laser sensor, calibration can be performed in the X, Y, and Z axes without requiring a "hard touch". Calibration in the X-Y plane can be performed as described above, and calibration on the Z-axis can be performed using reflective sensing using the analog laser sensor. In this embodiment, calibration on the Z-axis can be performed with the laser sensor tool positioned at the same height as during calibration in the X-Y plane. For example, the gripper unit can be positioned over a reflective portion of the work surface, such as a position adjacent to a landmark. Using the analog laser sensor tool, a height of the gripper unit can be determined. For example, the analog laser sensor tool can measure the time it takes for a reflection to be received and based on that time calculate a height in centimeters, inches, or other appropriate unit based on the LAS installation. Based on the known resolution of the motor operating the Z-axis, the height can be converted into encoder counts or steps. Alternatively, after calculating the height of the gripper unit, a position of the gripper unit on the Z-axis can recorded in encoder counts or steps. The gripper unit can then be lowered until it makes contact with the work surface and the position on the Z-axis again recorded. The height can then be converted into encoder counts or steps based on the difference of the two recorded positions.

In some embodiments, a cone-shaped tool can be used to determine a Z-value for the center of a bore hole on the work surface. The robotic arm, while gripping the cone-shaped tool, can be manually positioned such that the cone is inside the hole. Once positioned, a calibration procedure can be executed during which the robotic arm lifts the cone-shaped tool from the bore hole and moves to a plurality of equally offset points around the hole. At each point, the robotic arm can be slowly lowered until the tool contacts the work surface. A z encoder count can be recorded for each point. The average of the counts recorded for each point can be used as the Z-value for the center of the hole.

Figure 9:
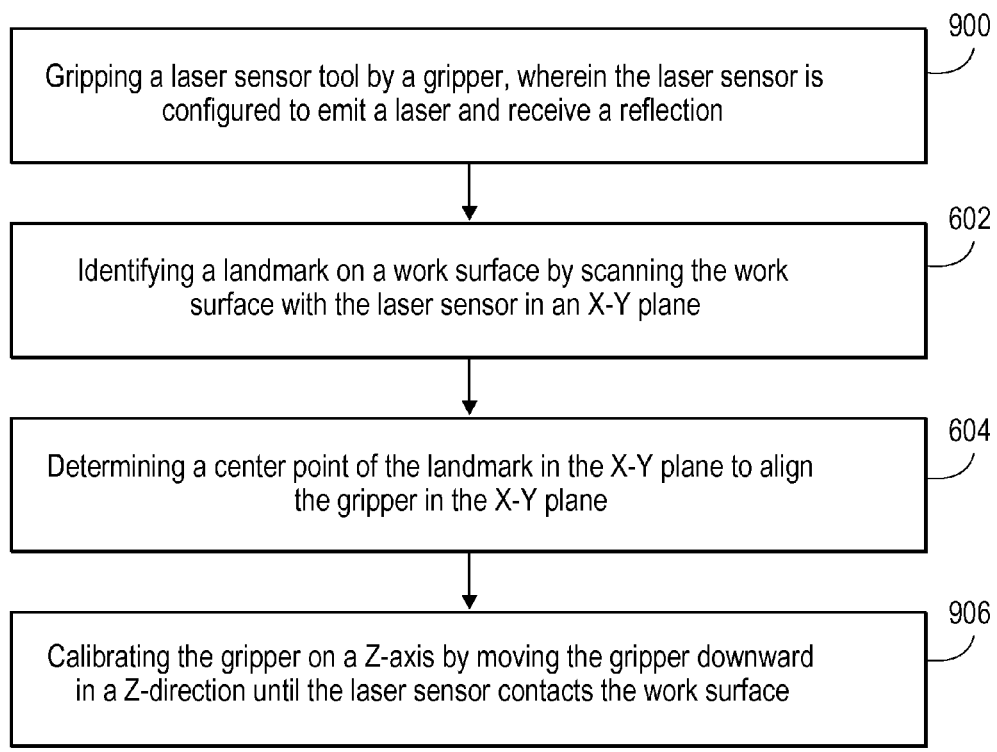
FIG. 9 shows examples of Z-calibration tools, in accordance with an embodiment of the invention.

FIG. 9 shows a method of calibrating an XYZ-robot, in accordance with an embodiment of the invention. At 900, a laser sensor tool is gripped by a gripper unit. In some embodiments, the gripper unit can be instructed to grip the laser sensor tool manually by a technician. In some embodiments, the gripper unit can automatically grip the laser sensor tool at a known location on the work surface. As described above, the laser sensor tool can be configured to emit a laser pulse and receive a reflection. At 902, a landmark can be identified on a work surface by moving the gripper unit in an X-Y plane and scanning the work surface with the laser sensor tool. At 904, a center point of the landmark is determined in the X-Y plane. At 906, the gripper unit is calibrated on a Z-axis by moving the gripper unit downward in a Z-direction until the gripper unit contacts the work surface. In some embodiments, the gripper unit contacts the work surface when the laser sensor tool being gripped contacts the work surface. In some embodiments, before calibrating the gripper unit on the Z-axis, the gripper unit can drop the laser sensor tool and pick up a grippable Z-calibration tool. The gripper unit contacts the work surface when the Z-calibration tool contacts the work surface.

In some embodiments, determining a center point of the landmark in the X-Y plane can include scanning the landmark in a first direction to determine a first edge of the landmark and a second edge of the landmark based on reflections received by the laser sensor. A first center point of the landmark on a first axis can be determined based on the first edge and the second edge. For example, the first edge and second edge can be coordinates on the first axis measured in steps or encoder counts. The center point on the first axis can be determined by averaging the steps or encoder counts of the first edge and second edge. The landmark can then be scanned in a second direction, orthogonal to the first direction, from the first center point of the landmark to determine a third edge and a fourth edge. A second center point of the landmark on a second axis can then be determined based on the third edge and fourth edge. The landmark can be repeatedly scanned in this manner until a plurality of center points are within a preset distance of each other.

Figure 10:
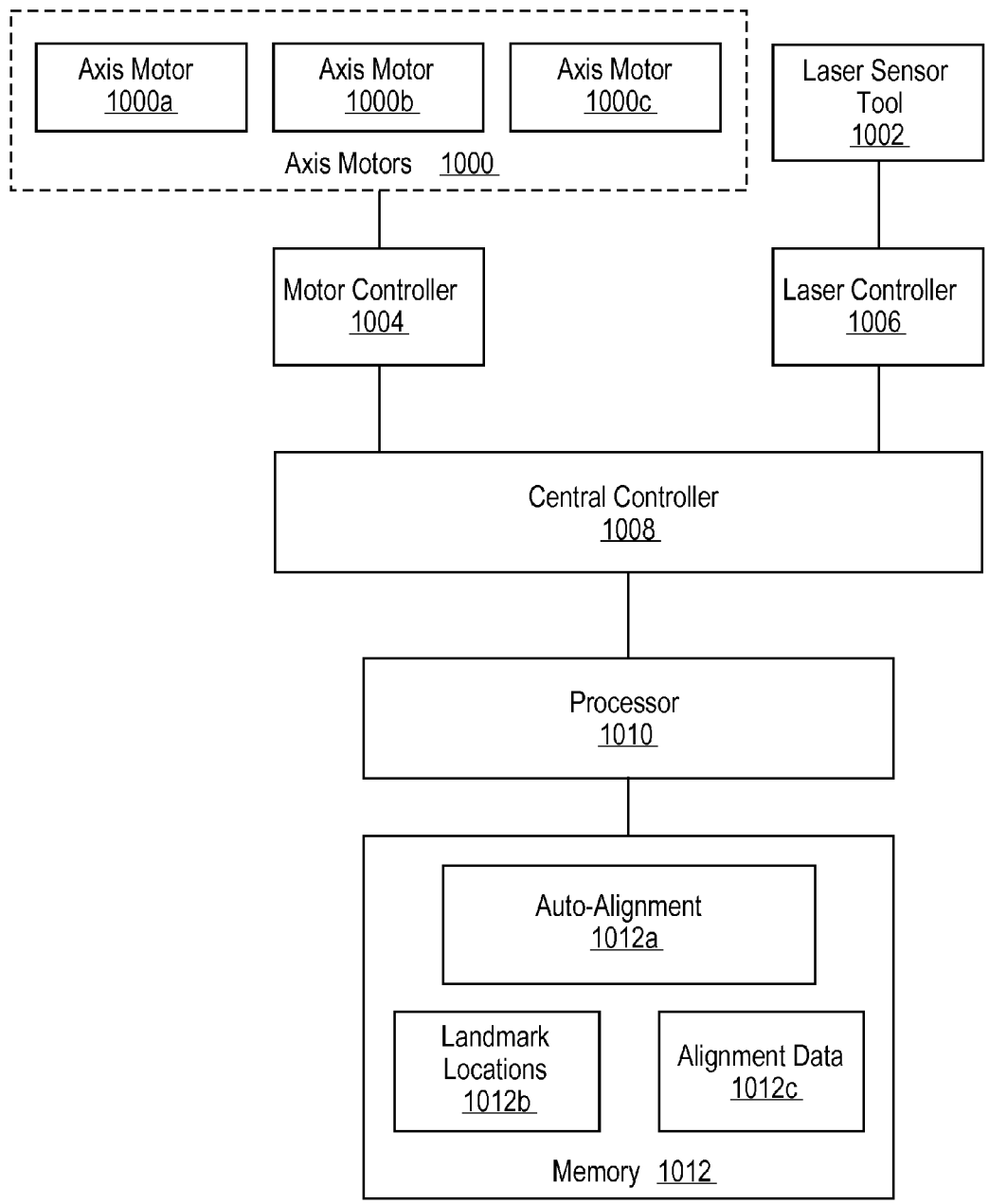
FIG. 10 shows a block diagram of an auto-alignment system, in accordance with an embodiment of the invention.

FIG. 10 shows a block diagram of an auto-alignment system, in accordance with an embodiment of the invention. The auto-alignment system can include a plurality of axis motors 1000, including axis motors 1000a, 1000b, and 1000c. The axis motors 1000 can be used to position the robotic arm and gripper unit in three-dimensional space over the work surface. A laser sensor tool 1002 can be gripped by the gripper unit and used to automatically align the robotic arm with the work surface. One or more motor controllers 1004 and a laser controller 1006 can relay instructions from a central controller 1008 during the auto-alignment process. In some embodiments, the motor controller 1004 can record position information from each axis motor, such as encoder counts or steps, and laser controller 1006 can monitor reflections received by the laser sensor tool. Central controller 1008 receive alignment instructions from processor 1010 and return alignment results, such as position information and reflection information, received from the motor controller and laser controller. The processor 1010 can use the information returned from the central controller to determine the center point positions and determine whether the alignment process is complete. The processor 1010 can be coupled to a memory 1012 which may comprise an auto-alignment module 1012a that may comprise computer code, executable by the processor 1010 to perform auto-alignment, including instructions to the axis motors to move the robotic arm along a programmed path in the X-Y axis and instructions to the laser sensor tool to scan the work surface as the robotic arm moves along the programmed path. The memory can further include storage for the determined landmark locations 1012b and alignment data 1012c, including position data for elements on the work surface (drawers, tools, etc.) relative to the landmark location(s).

The processor 1010 may comprise any suitable data processor for processing data. For example, the processor may comprise one or more microprocessors that function separately or together to cause various components of the system to operate.

The memory 1012 may comprise any suitable type of memory device, in any suitable combination. The memory 1012 may comprise one or more volatile or non-volatile memory devices, which operate using any suitable electrical, magnetic, and/or optical data storage technology.

The various participants and elements described herein with reference to the figures may operate one or more computer apparatuses to facilitate the functions described herein. Any of the elements in the above description, including any servers, processors, or databases, may use any suitable number of subsystems to facilitate the functions described herein, such as, e.g., functions for operating and/or controlling the functional units and modules of the laboratory automation system, axis controllers, sensor controllers, etc.

Figure 11:
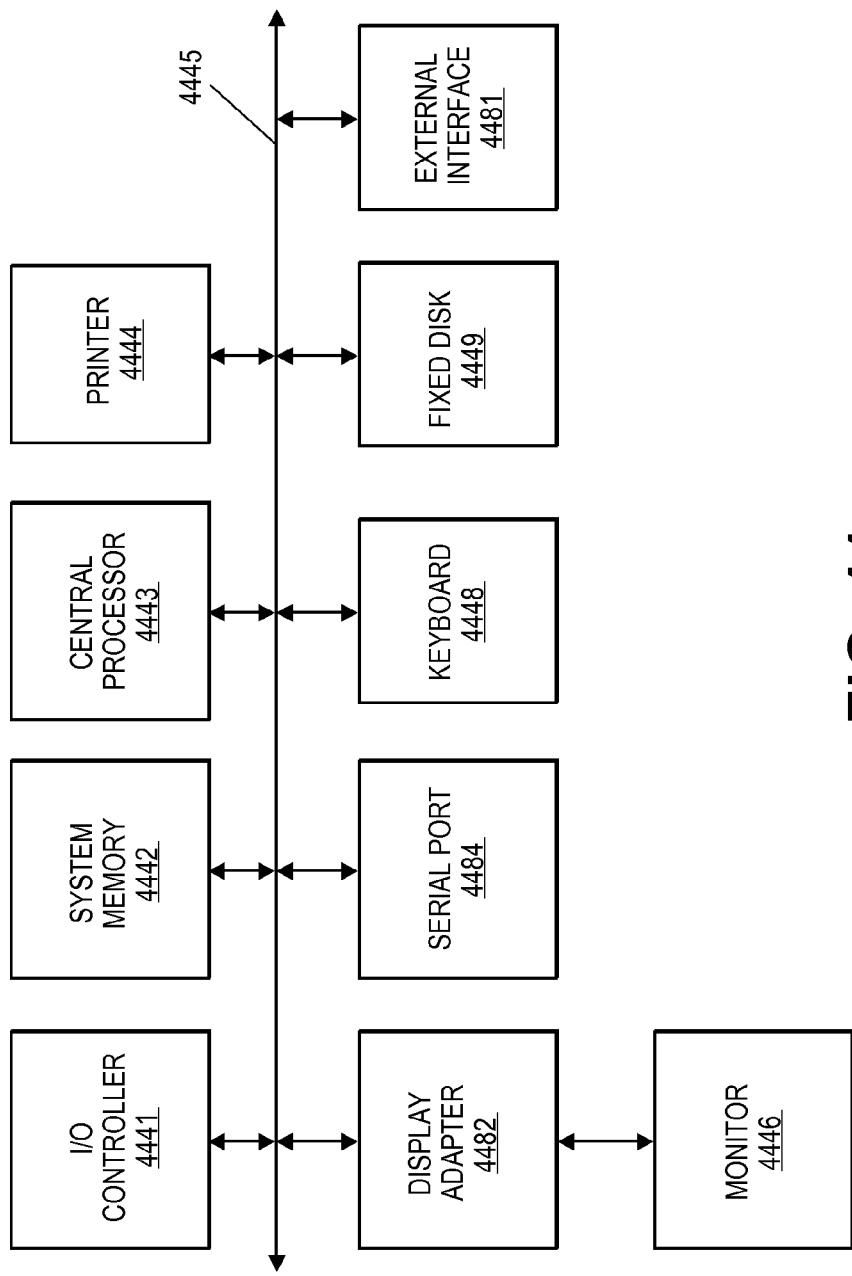
FIG. 11 shows a block diagram of a computer apparatus, in accordance with an embodiment of the invention.

Examples of such subsystems or components are shown in FIG. 11. The subsystems shown in FIG. 11 are interconnected via a system bus 4445. Additional subsystems such as a printer 4444, keyboard 4448, fixed disk 4449 (or other memory comprising computer readable media), monitor 4446, which is coupled to display adapter 4482, and others are shown. Peripherals and input/output (I/O) devices, which couple to I/O controller 4441 (which can be a processor or other suitable controller), can be connected to the computer system by any number of means known in the art, such as serial port 4484. For example, serial port 4484 or external interface 4481 can be used to connect the computer apparatus to a wide area network such as the Internet, a mouse input device, or a scanner. The interconnection via system bus allows the central processor 4443 to communicate with each subsystem and to control the execution of instructions from system memory 4442 or the fixed disk 4449, as well as the exchange of information between subsystems. The system memory 4442 and/or the fixed disk 4449 may embody a computer readable medium.

Embodiments of the technology are not limited to the above-described embodiments. Specific details regarding some of the above-described aspects are provided above. The specific details of the specific aspects may be combined in any suitable manner without departing from the spirit and scope of embodiments of the technology. For example, back end processing, data analysis, data collection, and other processes may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. Furthermore, the present technology may be implemented in the form and/or combination of any image processing. Based on the disclosure and teachings provided herein, a person of ordinary skill in the art will know and appreciate other ways and/or methods to implement the present technology using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for auto-alignment, comprising:
   gripping a laser sensor tool by a gripper unit of a robotic arm, wherein the laser sensor tool is configured to emit a laser pulse and receive a reflection of the laser pulse;
   identifying a landmark on a work surface by scanning the work surface with the laser sensor tool in an X-Y plane;
   determining a center point of the landmark in the X-Y plane to align the gripper unit with the work surface in the X-Y plane;
   aligning the gripper unit with the work surface in the X-Y plane based on the determined center point of the landmark; and
   calibrating the gripper unit on a Z-axis by moving the gripper downward in a z-direction until the gripper unit contacts the work surface.

2. The method of claim 1, wherein determining a center point of the landmark in the X-Y plane to align the gripper unit with the work surface in the X-Y plane further comprises:
   scanning the landmark in a first direction to determine a first edge of the landmark and a second edge of the landmark based on reflections received by the laser sensor tool;
   determining a first center point of the landmark on a first axis based on the first edge and the second edge;
   scanning the landmark in a second direction, substantially orthogonal to the first direction, from the first center point of the landmark to determine a third edge and a fourth edge;
   determining a second center point of the landmark on a second axis based on the third edge and fourth edge; and
   repeating scanning the landmark until a plurality of center points are within a preset distance of each other.

3. The method of claim 1, further comprising:
   after the center point of the landmark is determined, rotating the laser sensor tool 90 degrees relative to the laser sensor tool's initial position in the gripper unit and determining a second center point of the landmark;
   rotating the laser sensor tool 180 degrees relative the laser sensor tool's initial position in the gripper unit and determining a third center point of the landmark;

rotating the laser sensor tool 270 degrees relative the laser sensor tool's initial position in the gripper unit and determining a fourth center point of the landmark; and determining an average center point of the landmark by averaging the center points.

4. The method of claim 1, wherein identifying a landmark on the work surface by scanning the work surface with the laser sensor tool in an X-Y plane further comprises:

moving the gripper unit in a programmed path in the X-Y plane;

emitting pulses from the laser sensor tool; and recording reflections from the work surface, wherein the landmark is identified when a modified reflection is recorded.

5. The method of claim 2, wherein the landmark is a bore hole in the work surface.

6. The method of claim 2, wherein the landmark is an area of the work surface coated with a non-reflective coating.

7. The method of claim 1, further comprising:

storing the center point of the landmark; and comparing the center point of the landmark with alignment data to identify locations of one or more elements on the work surface.

8. The method of claim 7, wherein the one or more elements on the work surface can include a drawer, a rack, or a tool.

9. The method of claim 1, wherein calibrating the gripper unit on a Z-axis by moving the gripper downward in a z-direction until the gripper unit contacts the work surface, further comprising:

releasing, by the gripper unit, the laser sensor tool;

gripping, by the gripper unit, a Z-calibration tool;

positioning the gripper unit at a first height over the work surface, and recording a first Z position;

lowering the gripper unit in the Z-direction until the Z-calibration tool makes contact with the work surface, and recording a second Z position; and storing the first and second Z positions.

10. The method of claim 1, wherein the laser sensor tool includes a grippable housing including a groove or ledge.

11. An assembly, comprising:

a robotic arm, including a gripper unit configured to grip a laser sensor tool, wherein the robotic arm is configured to move in three dimensions over a work surface;

an auto-alignment system, including one or more controllers coupled to the robotic arm and laser sensor tool, wherein the auto-alignment system is configured to instruct the robotic arm to grip the laser sensor tool, wherein the laser sensor tool is configured to emit a laser pulse and receive a reflection, and to move the robotic arm over the work surface in an X-Y plane;

wherein the auto-alignment system is further configured to instruct the laser sensor tool to scan the work surface to identify a landmark, and determine a center point of the landmark in the X-Y plane to align the robotic arm with the work surface in the X-Y plane, wherein the auto-alignment system is further configured to align the gripper unit with the work surface in the X-Y plane based on the determined center point of the landmark, and wherein the auto-alignment system is further configured to calibrate the robotic arm on a Z-axis by moving the gripper downward in a z-direction until the gripper unit contacts the work surface, and storing a position of the robotic arm on the Z-axis when the gripper unit contacts the work surface.

12. The assembly of claim 11, wherein to determine a center point of the landmark in the X-Y plane, the auto-alignment system is configured to instruct the robotic arm and laser sensor tool to:

scan the landmark in a first direction to determine a first edge of the landmark and a second edge of the landmark based on reflections received by the laser sensor tool;

determine a first center point of the landmark on a first axis based on the first edge and the second edge;

scan the landmark in a second direction, orthogonal to the first direction, from the first center point of the landmark to determine a third edge and a fourth edge;

determine a second center point of the landmark on a second axis based on the third edge and fourth edge; and repeat scanning the landmark until a plurality of center points are within a preset distance of each other.

13. The assembly of claim 11, wherein the auto-alignment system is further configured to instruct the robotic arm and laser sensor tool to:

after the center point of the landmark is determined, rotate the laser sensor tool 90 degrees relative the laser sensor tool's initial position in the gripper unit and determine a second center point of the landmark;

rotate the laser sensor tool 180 degrees relative the laser sensor tool's initial position in the gripper unit and determine a third center point of the landmark;

rotate the laser sensor tool 270 degrees relative the laser sensor tool's initial position in the gripper unit and determine a fourth center point of the landmark; and determine an average center point of the landmark by averaging the center points.

14. The assembly of claim 11, wherein to identify a landmark on the work surface by scanning the work surface with the laser sensor tool in an X-Y plane, the auto-alignment system is further configured to:

move the gripper unit in a programmed path in the X-Y plane;

emit pulses from the laser sensor tool; and record reflections from the work surface, wherein the landmark is identified when a modified reflection is recorded.

15. The assembly of claim 13, wherein the landmark is a bore hole in the work surface.

16. The assembly of claim 13, wherein the landmark is an area of the work surface coated with a non-reflective coating.

17. The assembly of claim 11, wherein the auto-alignment system is further configured to:

store the center point of the landmark; and compare the center point of the landmark with alignment data to identify locations of one or more elements on the work surface.

18. The assembly of claim 17, wherein the one or more elements on the work surface can include a drawer, a rack, or a tool.

19. The assembly of claim 11, wherein the laser sensor tool includes a grippable housing including a groove or ledge.

20. A method of identifying a center point of a landmark, comprising:

gripping a laser sensor tool by a gripper unit of a robotic arm, wherein the laser sensor tool is configured to emit a laser pulse and receive a reflection of the laser pulse;

identifying a first set of boundary points of a landmark in a first direction by scanning the work surface with the laser sensor tool;

determining a first midpoint of the landmark in the first direction based on the first set of boundary points;

identifying a second set of boundary points of the landmark in a second direction, substantially orthogonal to the first direction, wherein the second set of boundary points and the first midpoint are collinear;

determining a second midpoint of the landmark in the second direction based on the second set of boundary points; and comparing a location of the first midpoint to a location of the second midpoint, and if the location of the first midpoint is within a predetermined distance of the second midpoint, calculating an average location and storing the average location, wherein the average location corresponds to a center point of the landmark;

if the location of the first midpoint is not within the predetermined distance of the second midpoint, iteratively determining midpoints in alternating orthogonal directions, until locations of at least two midpoints are within the predetermined distance of each other.

* * * * *